United States Patent Office 3,835,090
Patented Sept. 10, 1974

3,835,090
DENTAL RESTORATIVE CEMENT COMPOSITIONS
Robert Johns Gander, Whitehouse, and Richard McCrea Potts, East Brunswick, N.J., assignors to Johnson & Johnson
No Drawing. Filed Feb. 3, 1972, Ser. No. 223,284
Int. Cl. A61k 5/02; C08g 51/04
U.S. Cl. 260—42.15
25 Claims

ABSTRACT OF THE DISCLOSURE

Improved dental restorative cements are prepared by utilizing as a binder for inorganic filler materials, such as silane-treated crystalline quartz, either alone or together with other monomers, trimethacrylate and triacrylate esters of the aliphatic triols glycerol, trimethylolethane, trimethylolpropane, and trimethylolbutane.

The preferred restorative cements with respect to appearance are obtained by using finely divided crystalline quartz as a filler and a binder resin having an index of refraction in the range of 1.525 to 1.565. Binder resins having refractive indexes within this range can be obtained by including in the monomer mix together with the aliphatic triol at least one monomer of the gorup consisting of 1,3 - bis[2,3 - di(methacryloxy)-propoxy]-benzene (RGTMA), 2,2 - bis[4 - (3 - methacryloxy - 2-hydroxypropoxy)-phenyl]-propane (BIS-GMA), 1,3-bis(3-methacryloxy - 2-hydroxypropoxy)-benzene (RGDMA), 2,2-bis[4 - (2 - methacryloxyethoxy)-phenyl]-propane (SR–348), di(2 - methacryloxyethyl) diphenyl silane, di(2-methacryloxy-methylethoxy) diphenyl silane, and methacrylate ester (CMDPO–25 Methacrylate) in which a methacryloxy group or groups are attached to diphenyl oxide nuclei through single methylene bridges, the monomers being represented by the general formula:

where R in each instance is at least one of the group consisting of

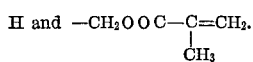

BACKGROUND OF THE INVENTION

Field of the Invention

This invention relates to improved cement compositions useful as dental restoratives, the compositions containing a novel binder system. More particularly, it relates to improved dental compositions of the composite type wherein trimethacrylate and triacrylate monomer esters of aliphatic triols of the gorup: glycerol, 1,1,1-trimethylolethane, 1,1,1-trimethylolpropane, and 1,1,1 - trimethylolbutane are used either alone or with other monomers in the binder system for the inorganic filler in highly filled restorative systems. These trimethacrylate and triacrylate monomer esters are glycerol trimethacrylate (GTMA), glycerol triacrylate (GTA) and monomers having the structure:

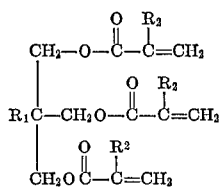

wherein $R_1$ is $CH_3-$, $CH_3CH_2-$, or $CH_3CH_2CH_2-$ and $R_2$ is H or $CH_3$. The monomers having this structure are:

trimethylolethane trimethacrylate (TMETMA),
trimethylolethane triacrylate (TMETA),
trimethylolpropane trimethacrylate (TMPTMA),
trimethylolpropane triacrylate (TMPTA),
trimethylolbutane trimethacrylate (TMBTMA),
trimethylolbutane triacrylate (TMBTA), These trimethacrylate and the closely related triacrylate monomers are employed as binder for the inorganic filler in highly filled restorative systems. In the preferred cement compositions the filler comprises finely divided quartz with the binder comprising a mixture of trimethylolpropane trimethacrylate (TMPTMA) and diphenyl oxide methacrylate monomer mixture of the type disclosed and claimed in copending application Ser. No. 52,095 the resin of the binder system having substantially the same index of refraction as the quartz.

Description of the Prior Art

Some of these triacrylate and trimethacrylate monomer esters of aliphatic triols, such for example as trimethylolpropane trimethacrylate (TMPTMA) and trimethylolpropane triacrylate (TMPTA) are kown and are commercially available the monomers being sold for such uses as casting compounds, fiberglass reinforced plastics, adhesives, coatings, ion-exchange resins, textile products, plastisols, dentures, rubber compounding, and other applications where di- and trifunctional acrylic monomers have been found useful. It has now been discovered that when any of these monomers are used in the binder system of highly filled dental composites for the direct filling of teeth, substantially improved results are surprisingly achieved, as contrasted with certain prior art alternatives.

Typical of the prior art with respect to highly filled dental composites is the subject matter of U.S. Pat. 3,066,112. It discloses dental filling materials comprising vinyl silane-treated fused silica and a binder consisting of the condensation product of two moles of methacrylic acid and the diglycidyl ether of bisphenol A or alternatively two moles of glycidyl methacrylate with one mole of bisphenol A, the binder being referred to as BIS-GMA. Because of high viscosity, the BIS-GMA must be diluted to the consistency of a medium syrup by use of suitable reactive monomers, e.g., methyl methacrylate, ethylene glycol dimethacrylate, and tetraethylene glycol dimethacrylate. In use as a dental restorative, the treated silica powder containing a suitable catalyst such as benzoyl peroxide is mixed with the syrupy liquid organic material which contains a suitable activator; and the mixed aggregate is promptly placed in the cavity to be filled wherein it hardens by polymerization of the organic material.

Such prior are dental restorative compositions have become known as composites and represent a very useful class of restorative materials in modern dental technology. A number are now commercially available. According to a paper presented by Mr. Frank H. Freeman of Kerr Manufacturing Company, Detroit, Mich., delivered in Houston, Tex., on Mar. 21, 1969 before the Dental Materials Group, North American Division, International Association for Dental Research the best of the then commercially available composites generally had compressive strengths in the range of about 28,000 to 34,000 pounds per square inch. For certain purposes, however, such as posterior restorations, higher compressive strengths are desired. Heretofore, in such cases silver amalgam restoratives were generally preferred over the composite type restorative materials because of the higher compressive strengths attainable, such as on the order of 40,000 p.s.i. or more.

Various inorganic filler materials have been suggested for use in preparing dental composites, the filler being mixed in finely divided form with the binder resin. It has been our experience that one of the preferred fillers is finely divided crystalline quartz. Not only is quartz highly resistant to abrasion, but the transparent nature of the quartz lends itself to giving fillings of improved appearance, the filling being hardly noticeable when the binder resin used has an index of refraction which is substantially the same as that of the quartz filler employed.

OBJECTS OF THE INVENTION

It is therefore an object of this invention to provide new dental restorative compositions of the composite type which exhibit desirably high compressive strength. It is another object to provide restorative compositions of the dental composite type of improved strength and in which the filler is finely divided quartz with the refractive index of the binder and filler being substantially the same, the restoratives being hardly visible against natural tooth structure after insertion. It is a still further object to provide dental restorative compositions which have all the advantages associated with prior art composite-type restorative compositions and fewer of the shortcomings. These and other objects of the present invention will become apparent as the detailed description thereof proceeds.

SUMMARY OF INVENTION

These objects are achieved by utilizing in the monomeric binder system either alone or together with other monomers one or more trimethacrylate or triacrylate esters of an aliphatic triol of the group glycerol, trimethylol ethane, trimethylol propane, and trimethylol butane. Aliphatic chains longer than the butane are generally not desirable as they tend to soften the resulting binder resin. The monomers so prepared are glycerol trimethacrylate (GTMA), glycerol triacrylate (GTA) which can be expressed by the formula:

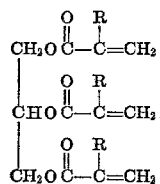

where R is in each instance H or $CH_3$ and monomers having the structure:

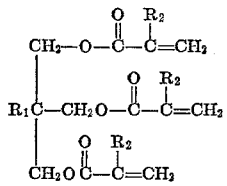

wherein $R_1$ is $CH_3-$, $CH_3CH_2-$, or $CH_3CH_2CH_2-$ and $R_2$ is H or $CH_3$. The monomers having this structure are:

trimethylolethane trimethacrylate (TMETMA),
trimethylolethane triacrylate (TMETA),
trimethylolpropane trimethacrylate (TMPTMA),
trimethylolpropane triacrylate (TMPTA),
trimethylolbutane trimethacrylate (TMBTMA),
trimethylolbutane triacrylate (TMBTA), To form the restorative composite the monomeric binder system is mixed with a major proportion of inorganic filler material such as silane-treated fused silica, crystalline quartz and the like, the filler making up more than 50% by weight of the resulting composite, e.g., about 70 to 90%, preferably about 75 to 85%, by weight, the preferred filler being crystalline quartz. After polymerization and setting, the composite forms a hard, water-insoluble filling material having desirably high compressive strength. Further details are set forth in the following subsections and illustrative examples.

Dental Restorative Compositions of the Invention

The trimethacrylate and triacrylate ester aliphatic triols disclosed herein each afford particular advantages when used as a binder for inorganic filler materials. In particular, hard, water-insoluble dental restorative compositions having desirably high compressive strengths can be readily prepared. Moreover, the low viscosity of the monomer composition permits its use in the formulation of composite restorative compositions without the need of viscosity reducing diluents. However, it will be understood that other polymerizable monomers, including the aforementioned BIS-GMA, can be included in the dental compositions along with the trimethacrylate or triacrylate aliphatic triol monomer if desired, and improvements in compressive strength and appearance be obtained. The trimethacrylate or triacrylate ester triol monomer should, however, be present in the binder system in amounts of at least 10% by weight of the binder monomers employed.

As already indicated, composite restorative compositions in accordance with this invention are prepared by mixing the said monomer composition with a major proportion of a partciulate inorganic filler material, the latter making up more than 50% by weight of the resulting composite, e.g., about 70 to 90%, preferably about 75 to 85% by weight. A variety of inorganic filler materials can be employed. Representative of such materials are silica, glass beads, aluminum oxide, fused silica, fused or crystalline quartz and the like. The particle size of the filler material generally ranges from submicron to about 125 microns with the average particle size being in the range of about 15 to 30 microns and preferably is in the range of about 20 to 25 microns.

The particulate inorganic filler material should preferably be treated with a keying agent to improve the binding of the resin thereto. Keying agents and the method of use can be described in the aforementioned U.S. Pat. 3,066,112. Keying agents which have been found to be particularly suitable are the high performance ethylenically unsaturated organosilane compounds such as gamma-methacryloxypropyltrimethoxysilane, vinyltrichlorosilane, vinyltriethoxysilane, vinyltrimethoxysilane, vinyltriacetoxysilane and the like.

Initiation of polymerization which causes the composite to set into a hard mass is conveniently affected at room temperature, e.g., about 25 to 30° C., by inclusion in the formulation of a peroxide polymerization catalyst and an activator which functions to cause a rapid decomposition of peroxide with the resultant formation of polymerization-inducing free radicals.

A variety of peroxide polymerization catalysts as known in the art can be used, benzoyl peroxide, 2-4-dichlorobenzoyl peroxide and 4-chlorobenzoyl peroxide being representative thereof. The catalyst is generally employed in amounts from 0.1 to 1.0% by weight based on the weight of active monomer or monomers present.

Similarly, an activator or accelerator material which causes decomposition of the catalyst is employed in the formulation, such as, for example, N,N-dialkylanilines and N,N-dialkyltoluidines.

The activator is generally employed in amounts ranging from about 0.1 to 1.0 weight percent based on the weight of the monomer or monomers present. While various activators can be used, amine activators of the type represented by the following formula are particularly effective:

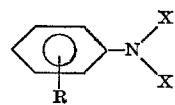

wherein R is hydrogen or methyl and X is methyl, ethyl or hydroxyethyl. A referred activator is N,N-di(2-hydroxyethyl)-p-toluidine.

For convenience in use, the composite dental filling compositions can be formulated in the form of pastes adapted for ready mixing by the dentist or other user. Thus, a paste (A) can be formulated containing the resin-forming monomer, inorganic filler and activator while a second paste (B) can contain the monomer, filler and peroxide, approximately the same proportions of monomer and filler being present in each paste for convenience, although not necessarily limited to such proportions. Upon mixing of the two pastes, polymerization of the monomer or monomers is initiated with the working or hardening time being variable and controllable by use of more or less of the activator.

A typical formulation of Pastes A and B in this embodiment using a preferred monomer blend would be as follows:

| Component | Proportion, Paste A | Weight percent Paste B |
|---|---|---|
| Silane-treated quartz | 82.0 | 82.0 |
| CMDPO-25 MA* | 7.0 | 7.0 |
| Trimethylolpropane trimethacrylate (TMPTMA) | 11.0 | 11.0 |
| Accelerator A | 0.02 | |
| Benzoyl peroxide | | 0.02 |

*CMDPO-25 MA is a mixture of polymerizable methacrylate esters of diphenyl oxide prepared in the manner described in Example 1 of co-pending application Ser. No. 52,095 and in Example 2. These methacrylate esters have a methacryloxy group or groups attached to diphenyl oxide nuclei through single methylene bridges, the monomers being represented by the general formula:

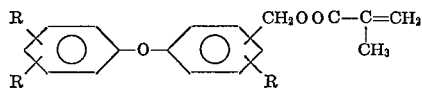

where R in each instance is at least one of the group consisting of H and $-CH_2OOCC=CH_2$
   $|$
   $CH_3$ and being present in the proportions set forth in the following table:

TABLE

| Position of group R | Designation | Percent of monomer in mix |
|---|---|---|
| o | Mono-CMDPO | 0-2 |
| p | Mono-CMDPO | 6-8 |
| o,p' | Di-CMDPO | 20-23 |
| p,p' | Di-CMDPO | 46-50 |
| o,p,p' | Tri-CMDPO | 13-23 |
| o,p,o',p' | Tetra-CMDPO | 1-2 |

The monomer composition in a typical one-to-one mix of Pastes A and B would then be 61% by weight of trimethylolpropane trimethracrylate (TMPTMA), based on total monomer.

For aesthetic purposes it is highly desirable in a dental restorative, particularly where used for anterior fillings to have the restorative blend in with the adjacent tooth structure. This is best achieved by using a translucent filler together with a translucent to transparent binder resin. All of the trimethacrylate and triacrylate ester aliphatic triol monomers disclosed herein when polymerized give translucent to transparent resins.

The preferred restorative compositions are those using finely divided crystalline quartz as the filler. Where the index of refraction of the binder system for the crystalline quartz filled restorative is within the range of 1.525 to 1.565 restoratives prepared from the same blend well with the tooth structure with the best effects being obtained with refractive indexes of about 1.545. Homopolymers formed of these ester aliphatic triol monomers generally have refractive indexes below 1.525.

It has been found that the index of refraction of the binder resin resulting from polymerization of these monomers can be increased and index of refractions substantially matching that of the crystalline quartz filler can be obtained by mixing with the aliphatic ester triol monomer one or more monomers of the group consisting of 1,3-bis[2,3 - di(methacryloxy)-propoxy]-benzene (RGTMA) designated by the formula:

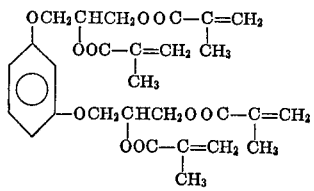

2,2 - bis[4-(3-methacryloxy-2-hydroxypropoxy)-phenyl]-propane (BIS-GMA) designated by the formula:

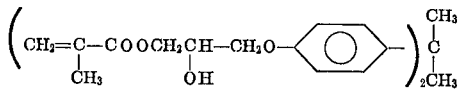

1,3 - bis(3 - methacryloxy - 2 - hydroxypropoxy)-benzene (RGDMA) designated by the formula:

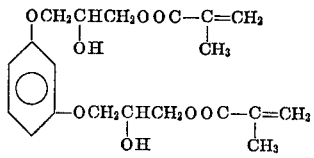

2,2-bis[4-(2-methacryloxyethoxy)-phenyl]-propane (SR-348) designated by the formula:

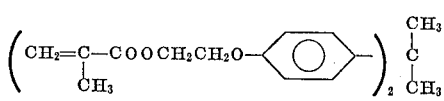

Di(2-methacryloxyethyl) diphenyl silane, designated by the formula:

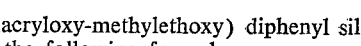

Di(2-methacryloxy-methylethoxy) diphenyl silane, represented by the following formulas:

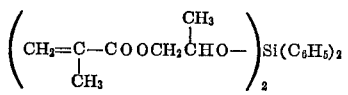

and methacrylate esters (CMDPO–25 Methacrylate) in which a methacryloxy group or groups are attached to diphenyl oxide nuclei through single methylene bridges, the monomers being repersented by the general formula:

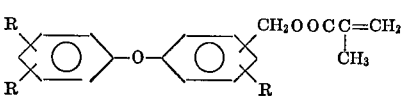

where R in each instance is at least one of the group consisting of

H and $-CH_2OOC-C=CH_2$
           $|$
           $CH_3$

Although crystalline quartz is preferred as the filler, glass or other translucent or transparent material may be used as previously indicated. Many glasses have a relatively low refractive index with the refractive index of the same being so low that it is difficult to match the refractive index of the binder of the binder resin with that of the glass. Accordingly, where it is desired to use glass as the filler a glass should be selected that has a sufficiently high refractive index so that the same can be substantially matched by the refractive index of the resin binder in the finished restorative.

EXAMPLE 1

Trimethylolpropane Trimethacrylate (TMPTMA) With 81.5% Quartz Filler and 1.3% Colloidal Silica Crystal quartz is ground in a porcelain ball mill to a size which will pass through a 200-mesh screen. The size range of the particles is from 75 microns to less than one micron with a median size of about 20 microns. The ground quartz (500 grams) is placed in 1000 milliliters of 20% hydrochloric acid and heated to 80° C. for an hour. The acid is filtered, and the quartz is washed with water until effluent water reaches pH 6 to 7. The quartz is then dried in an open glass tray at 130° F.

A water solution of silane is prepared by placing 0.4 milliliter of acetic acid and 10 grams of *gamma*-methacryloxy-propyltrimethoxysilane in 200 milliliters of water and stirring rapidly at room temperature. A slurry is made of the acid-washed quartz and the silane solution. The liquid is then sucked from the quartz on a ceramic filter, so as little water as possible remains on the quartz. The quartz is again dried at 130° F. on a glass tray. It is stirred frequently during drying to prevent caking. The resulting silane-treated quartz is employed in preparing two pastes hereinafter described.

Two pastes are prepared which are substantially identical in composition except that one contains benzoyl peroxide as an additional component and the other contains N,N - di(2-hydroxyethyl)-*p*-toluidine. Trimethylolpropane trimethacrylate (TMPTMA) is the only monomer in this system. The compositions of the pastes are as follows:

Paste A:                                     Weight percent
   Trimethylolpropane trimethacrylate
    (TMPTMA) _____ 16.9
   N,N-di(2-hydroxyethyl)-*p*-toluidine _____ 0.2
   Silane-treated crystal quartz _____ 81.6
   Silane-treated colloidal silica _____ 1.3

Paste B:
   Trimethylolpropane trimethacrylate
    (TMPTMA) _____ 16.9
   Benzoyl peroxide _____ 0.3
   Silane-treated crystal quartz _____ 81.5
   Silane-treated colloidal silica _____ 1.3

Equal parts by weight of Pastes A and B are mixed for 30 seconds and then packed into cylindrical split steel molds 0.158 inch in diameter and about 0.31 inch in length, the ends of the molds being covered with smooth glass plates. After three minutes hardening occurs, and the molds are immersed in water at 100° F. for 24 hours. The composite cylinders, which contain 81.5% quartz filler, are then expelled from the steel molds, accurately measured, and tested. Ten cylinders are crushed in compressive strength tests using an Instron tester, and another ten cylinders are crushed in determination of the diametrical tensile strength.

Compressive strength is found to be 47,680 p.s.i. and tensile strength is found to be 6,985 p.s.i.

Flexural modulus, 2,493,000 p.s.i.
Rockwell 30T Hardness, 70.

EXAMPLE 2

Trimethylolpropane Trimethacrylate (TMPTMA) and Mixed Methacryloxymethyl-diphenyloxides (CMDPO–25 MA) Composite With 81% Quartz Filler A monomer mix, herein referred to as CMDPO–25 MA, is prepared as follows:

A 2-liter, 3-neck flask is fitted with a thermometer, mechanical stirrer, dropping funnel and water condenser. In the flask are placed 127.6 grams of powdered sodium methacrylate, 600 milliliters of dimethyl sulfoxide and 0.076 gram of *p*-methoxyphenol. The dropping funnel is charged with 150.0 grams of CMDPO–25 a mixture of di(chloromethyl) diphenyl oxides described above.

The slurry in the flask is warmed to approximately 75° C. in an electrically-heated oil bath and maintained at this temperature during the 70 minutes required to add the CMDPO–25 dropwise from the dropping funnel. After addition is complete, the reaction mixture is stirred and heated at 75° C. for two hours longer. The reaction mixture is then cooled to about 35° C. and poured into a slurry of 300 grams of ice in 2100 milliliters of water.

The heavy oil product is separated, and the aqueous solution is extracted with 500 milliliters of a mixed solvent made from 9 parts by volume of petroleum ether (b.p. 30–60° C.) and 1 part by volume of benzene. The extract is added to the heavy oil, and the whole is diluted to a volume of 1400 milliliters with more mixed solvent. This organic solution is then extracted with four 200-milliliter portions of water. The light-yellow organic solution is then dried over Drierite overnight.

A chromatography tube, 38 x 230 millimeters, is packed with 60 grams of adsorption alumina having an 80 to 200-mesh particle size. The column is wet out with petroleum ether, and the filtered, dried solution is passed through it at a dropwise rate. About 3.5 hours are required to pass the solution through the column.

The colorless, chromatographed solution is put in a distilling flask with 0.024 gram of *p*-methoxyphenol, and the solvent is distilled with a bath temperature of 40 to 50° C. and water-pump pressures. The last few milliliters of solvent are pumped off with an oil pump at pressures from 5.0 to 2.5 millimeters of mercury. The residue remaining in the distilling flask is CMDPO–25 MA, a colorless, odorless oil weighing 156 grams, which has a viscosity of less than 100 centipoises at 25° C. and a refractive index $N_D^{30.0°}$ C. 1.5489. The NMR spectrum indicates the absence of any unreacted chloromethyl groups or other impurities in the product. The homopolymer of CMDPO–25 MA has a refractive index of 1.588.

Following the procedure set forth in Example 1 but using as the binder monomer different blends of trimethylolpropane trimethacrylate (TMPTMA) and CMDPO–25 MA a series of cylinders are prepared. The cylinders are tested for strength in the same manner as described in Example 1. The relative strengths of the cement cylinders prepared using different blends of trimethylolpropane trimethacrylate (TMPTMA) and CMDPO–25 MA and the index of refraction of the binder polymer in each case are shown in the following Table:

TABLE

| Binder | | Refractive index of binder polymer | Compressive strength, p.s.i. | Tensile strength, p.s.i. | Flexural modulus, p.s.i. |
|---|---|---|---|---|---|
| Parts by weight | Monomer | | | | |
| 30 | CMPDO-25 MA | 1.535 | 40,270 | 6,930 | 2.45×10 |
| 70 | TMPTMA | | | | |
| 39 | CMPDO-25 MA | 1.545 | 46,230 | 6,960 | 2.20×10⁶ |
| 61 | TMPTMA | | | | |
| 50 | CMPDO-25 MA | 1.551 | 37,400 | 6,677 | 2.1×10⁵ |
| 50 | TMPTMA | | | | |

EXAMPLE 3

Trimethylolpropane Trimethacrylate (TMPTMA) and Mixed Methacryloxymethyl Diphenyloxides (CMDPO–25 MA) Composite With 82% Quartz Filler and Tooth Restoration Therefrom Using a blend of 39 parts by weight chromatographed CMDPO–25 MA and 61 parts by weight of trimethylolpropane trimethacrylate (TMPTMA) as the binder monomer and silane-treated quartz filler prepared as in Example 1, the following pastes are prepared:

Paste A:                                    Parts by weight
  Trimethylolpropane trimethacrylate
    (TMPTMA) _____ 11.0
  CMDPO–25 MA (Dimethacryloxymethyl di-
    phenyloxide _____ 7.0
  N,N-di(2-hydroxyethyl)-p-toluidine _____ 0.02
  Silane-treated crystal quartz _____ 82.0
Paste B:
  Trimethylolpropane trimethacrylate
    (TMPTMA) _____ 11.0
  CMDPO–25 MA (Dimethacryloxymethyl di-
    phenyloxide) _____ 7.0
  Benzoyl peroxide _____ 0.02
  Silane-treated crystal quartz _____ 82.0

Equal parts by weight of pastes A and B are mixed for 30 seconds, and cylinders containing 82% quartz filler are molded as described in Example 2 for compressive strength tests, tensile strength tests, and Rockwell Hardness tests. Flexural modulus sample beams, 1.25 inch long, 0.25 inch wide and 0.06 inch thick, are also molded; and the modulus test is made across a 1-inch span. Results of these tests are as follows:

Compressive strength, p.s.i.: 48,770±2,020
Tensile strength, p.s.i.: 7,010±535
Flexural modulus, p.s.i.: $2.57 \times 10^6 \pm 0.100 \times 10^6$
Rockwell Hardness (F Scale): 103.

This two-paste system is used to place a mesio-occlusal Class II restoration in the maxillary right second premolar of a dental patient. The tooth is prepared for filling by conventional drilling techniques such as those used prior to placing silver amalgam restorations. The base of the cavity is lined with a zinc oxide-eugenol cement base. A metal matrix band is then placed around the tooth, and wedges are placed to avoid overhangs and to provide proper axial contour.

Approximately equal amounts of pastes A and B are mixed on a coated paper mixing pad for about 20 seconds. The mixed paste is then inserted using normal packing pressure to fill undercuts. The restorative gels to a hard composition about two minutes after insertion. Five minutes after insertion the matrix band is carefully removed. The filling is finished with a fine, water-cooled diamond stone, then with a fine green stone, and finally with a lubricated fine white stone. The finished restoration is strong and durable, giving excellent service in the patient's mouth. Also, on casual inspection no difference between the restoration and the adjoining tooth enamel can be discerned, the restoration being unnoticeable.

EXAMPLE 4

Trimethylolpropane Trimethacrylate (TMPTMA) and Mixed Methacrylate-Acetate Esters of Trimethylolpropane (ACET) Composite With 81% Quartz Filler A monomer herein referred to as ACET, mixed methacrylate-acetate esters of trimethylolpropane, is prepared as follows. A solution of the following is dried over 8 g. of Type 4A molecular sieves: trimethylolpropane, 33.6 g. (0.25 mole); acetone, Reagent Grade, 108 ml.; pyridine, Reagent grade, 61.0 g. (0.77 mole); p-methoxyphenol, 0.04 g. The dried solution is filtered into a 500-ml. 3-neck flask bearing a thermometer, condenser, mechanical stirrer and dropping funnel. The solution is stirred and cooled intermittently in a Dry Ice-acetone bath so as to maintain the temperature in the range $-5°$ to $+5°$ C. while 53.4 g. (0.51 mole) of redistilled methacrylyl chloride (b.p. 43–44°/97 mm.) is added dropwise during 24 minutes. Then 20.4 g. (0.26 mole) of acetyl chloride is added during 8 minutes at the same temperature. The cooling bath is removed, and the reaction mixture is stirred for 4.5 hours.

The reaction mixture is filtered to remove pyridine hydrochloride which is washed with 200 ml. of cold, dry benzene. The acetone filtrate is poured into 450 g. of water and 150 g. of ice, and this water solution is extracted with the 200 ml. of benzene used to wash the pyridine hydrochloride. The water solution is then extracted with three more 200-ml. portions of benzene. The combined benzene extracts are washed with two 100-ml. portions of 5% sodium bicarbonate solution and two 100-ml. portions of water. The benzene solution is dried, filtered, and 0.024 g. di-tert.-butylhydroquinone is dissolved in it. The benzene is then evaporated first at water pump pressures and then at less than 5 mm. pressure using an oil pump. The residue after evaporation of the solvent is the mixed methacrylate-acetate esters (ACET), a nearly water-white, mobile liquid with a sweet odor, $N_D^{30.0}$ 1.4592, weighing 28.3 grams. From the integrated NMR spectrum areas proportional to the olefinic protons (on methacrylate moieties) and the ethyl protons (on trimethylolpropane moieties) are obtained. On the average, the mixed esters contain 1.75 methacrylate ester groups per molecule and 1.25 acetate ester groups per molecule.

Following the procedure of Example 1, a binder monomer is made from 40 weight percent mixed methacrylate-acetate esters of trimethylolpropane and 60 weight percent trimethylolpropane trimethacrylate. Equal parts by weight of Pastes A and B are mixed for 30 seconds, samples are molded, and tested after 24-hour immersion in 100° F. water.

Compressive strength, p.s.i.: 42,370±2,115
Tensile strength, p.s.i.: 6,650±680
Flexural modulus, p.s.i.: $2.37 \times 10^6 \pm 0.147 \times 10^6$
Refractive index of binder: 1.512.

EXAMPLE 5

Trimethylolpropane Trimethacrylate (TMPTMA) and 1,3-Bis[2,3 - Di(Methacryloxy - Propoxy] - benzene (RGTMA) Composite With 82% Quartz Filler A monomer of the type described and claimed in copending application filed herewith and herein referred to as RGTMA, resorcinol glycidyl tetramethacrylate (II) is prepared as follows:

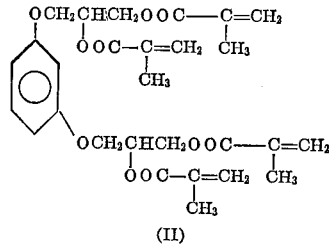

(II)

In a 2-liter, 3-neck flask are placed 600 g. (5.10 epoxy equivalents) of resorcinol diglycidyl ether; 430 g. (5.00 moles) methacrylic acid; 5.0 g. triphenylphosphine and 0.5 g. p-methoxyphenol. A water condenser is mounted on the flask and the contents are stirred continuously for 48 hours while heating in an oil bath at 80–85° C. The reaction mixture at this point is essentially resorcinol glycidyl dimethacrylate (I), a yellow, viscous liquid with the following properties:

Weight per epoxy equivalent: 33,643.
Acid number: 3.2 mg. KOH/gram.
$n_D^{30}$ 1.5268.

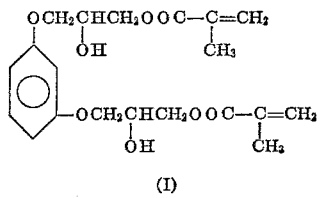

(I)

A solution of the following is dried overnight over 10 grams of Type 4A molecular sieves: resorcinol glycidyl dimethacrylate (I), 100 g. (0.51 mole); acetone, Reagent Grade, 150 ml.; triethylamine, 51.6 g. (0.51 mole); p-methoxyphenol, 0.04 g. The dried solution is filtered into a 500-ml., 3-neck flask bearing a thermometer, condenser, mechanical stirrer and dropping funnel. The solution is stirred and cooled intermittently in an ice-and-water bath to maintain the temperature in the 24 to 30° C. range while 53.2 g. (0.51 mole) of redistilled methacrylyl chloride (b.p. 43°/96 mm.) is added during one hour.

The reaction mixture is poured into 600 g. of water and 200 g. of ice. The water is extracted with two 400-ml. portions of diethyl ether. The combined ether extracts are washed successively with two 100-ml. portions of 5% sodium bicarbonate solution and two 100-ml. portions of water. The washed ether solution is dried over molecular sieves, filtered, and 0.012 g. of phenothiazine added. The ether is evaporated at water pump pressures and the last of it removed at 4 mm. pressure. The product (II) is a mobile yellow liquid with a pleasant odor which weighs 73 g.; $n_D^{30.0}$ 1.5058.

Following the procedure of Example 1 a binder monomer is made from 48.5 weight percent 1,3-bis[2,3-di-(methacryloxy)-propoxy]-benzene (II) and 51.5 weight percent trimethylolpropane trimethacrylate. Equal parts by weight of Pastes A and B are mixed for 30 seconds, samples are molded, and tested after 24-hour immersion in 100° F. water;

Compressive strength, p.s.i.: 43,516±2,059
Tensile strength, p.s.i.: 7,310±280
Flexural modulus, p.s.i.: $2.70 \times 10^6 \pm 0.111 \times 10^6$
Rockwell Hardness (H Scale): 113
Refractive index: 1.540.

EXAMPLE 6

Trimethylolpropane Trimethacrylate (TMPTMA) and 2, 2-bis[4-(3-Methacryloxy-2-Hydroxypropoxy)-Phenyl]-Propane (BIS-GMA) Composite With 77.1% Quartz Filler and 2.9% Colloidal Silica Following the procedure set forth in Example 1 but using as the binder monomer different blends of trimethylolpropane trimethacrylate (TMPTMA) and BIS-GMA, a series of samples is prepared. Strength of the composite and refractive index of the binder resin are summarized in the following Table:

TABLE FOR EXAMPLE 6

| Binder | | Refractive index of binder polymer | Compressive strength, p.s.i. | Tensile strength, p.s.i. | Flexural modulus, p.s.i. |
|---|---|---|---|---|---|
| Parts by weight | Monomer | | | | |
| 25 | BIS-GMA | 1.513 | 42,562 | 6,977 | 1.94×10⁶ |
| 75 | TMPTMA | | | | |
| 50 | BIS-GMA | 1.539 | 41,400 | 7,410 | 1.98×10⁶ |
| 50 | TMPTMA | | | | |
| 62 | BIS-GMA | 1.545 | 41,990 | 8,100 | 2.29×10⁶ |
| 38 | TMPTMA | | | | |

EXAMPLE 7

Trimethylolpropane Triacrylate (TMPTA) With 82% Quartz Filler

Using 18 percent by weight trimethylolpropane triacrylate (TMPTA) as the the binder monomer in place of trimethylolpropane trimethacrylate (TMPTMA) and 82 percent by weight of finely divided crystalline quartz as the filler, Example 1 is repeated. The trimethylolpropane triacrylate (TMPTA) acts in the cement preparation much the same way as the trimethylolpropane trimethacrylate (TMPTMA) of Example 1 differing primarily in that the reaction appeared to be somewhat more exothermic in nature.

The restorative cement composition has the following properties:

Compressive strength (p.s.i.): 46,543
Tensile strength (p.s.i.): 8,160
Flexural (p.s.i.): $2.76 \times 10^{-6}$
Rockwell Hardness on 30T Scale: 69.

EXAMPLE 8

Trimethylolpropane Triacrylate (TMPTA) and BIS-GMA Composite With Quartz Filler

Following the procedure set forth in Example 1 but using as the binder monomer different blends of trimethylolpropane triacrylate (TMPTA) and BIS-GMA a series of samples is prepared. Their refractive indexes, compressive and tensile strengths, and flexural modulus are summarized in the following Table:

TABLE FOR EXAMPLE 8

| Binder | | Percent by weight quartz in cement composition | Refractive index of binder polymer | Compressive strength, p.s.i. | Tensile strength, p.s.i. | Flexural modulus, p.s.i. |
|---|---|---|---|---|---|---|
| Monomer | Parts by weight of binder | | | | | |
| BIS-GMA | 12.5 | 80 | 1.519 | 37,245 | 6,270 | 2.29×10⁶ |
| TMPTA | 87.5 | | | | | |
| BIS-GMA | 25 | 80 | 1.523 | 35,320 | 6,670 | 2.05×10⁶ |
| TMPTA | 75 | | | | | |
| BIS-GMA | 50 | 79.7 | 1.536 | 38,774 | 7,430 | 2.18×10⁶ |
| TMPTA | 50 | | | | | |
| BIS-GMA | 75 | 77.5 | 1.554 | 34,625 | 7,900 | 2.04×10⁶ |
| TMPTA | 25 | | | | | |

EXAMPLE 9

Further Illustrative Examples of Restorative Compositions Utilizing TMPTMA and Having Indexes of Refraction Within the Range of 1.5 to 1.6

Using as the binder a monomer mix containing TMPTMA together with another selected monomer and finely divided crystalline quartz as a filler restorative, compositions are prepared in the manner set forth in Example 1. These compositions together with the indexes of refraction of the binder resin and of the restorative composition on curing are set forth in the following Table. The compositions blend well with natural tooth structure and when placed in a tooth as a filling can hardly be noticed on casual observation.

TABLE FOR EXAMPLE 9

| Parts by wt. | Binder Monomer | Refractive index of— Binder polymer | Cured composite |
|---|---|---|---|
| 27.7 | TMPTMA | | |
| 72.3 | 1,3-bis(3-methacryloxy-2-hydroxy-propoxy)-benzene (RGDMA). | 1.545 | 1.545±0.005 |
| 41.0 | TMPTMA | | |
| 59.0 | 2,2-bis[4-(2-methacryloxyethoxy)-phenyl]-propane (SR-348). | 1.545 | 1.545±0.005 |
| 21.0 | TMPTMA | | |
| 55.0 | Di(2-methacryloxy-1-methylethoxy) diphenyl silane. | | |
| 24.0 | Di(2-methacryloxy-2-methylethoxy) diphenyl silane. | 1.545 | 1.545±0.005 |
| 33.9 | TMPTMA | | |
| 66.1 | Di(2-methacryloxyethyl) diphenyl silane. | 1.545 | 1.545±0.005 |

EXAMPLE 10

Further Illustrative Examples of Restorative Compositions Using TMPTA and Having Indexes of Refraction Within the Range of 1.5 to 1.6.

Using as the binder monomer a monomer mix containing TMPTA together with another selected monomer and finely divided crystalline quartz as a filler restorative, compositions are prepared in the manner set forth in Example 1. These compositions together with the indexes of refraction of the binder resin and of the restorative composition on curing are set forth in the following Table. The compositions blend well with natural tooth structure and when placed in a tooth as a filling can hardly be noticed on casual observation.

TABLE FOR EXAMPLE 10

| Parts by wt. | Binder Monomer | Refractive index of— Binder polymer | Cured composite |
|---|---|---|---|
| 23.2 | TMPTA | | |
| 76.8 | 1,3-bis(3-methacryloxy-2-hydroxy-propoxy)-benzene (RGDMA). | 1.545 | 1.545±0.005 |
| 35.3 | TMPTA | | |
| 64.7 | 2,2-bis[4-(2-methacryloxyethoxy)-phenyl]-propane (SR-348). | 1.545 | 1.545±0.005 |
| 17.5 | TMPTA | | |
| 57.5 | Di(2-methacryloxy-1-methylethoxy) diphenyl silane. | | |
| 25.0 | Di(2-methacryloxy-2-methylethoxy) diphenyl silane. | 1.545 | 1.545±0.005 |
| 28.9 | TMPTA | | |
| 71.1 | Di(2-methacryloxyethyl) diphenyl silane. | 1.545 | 1.545±0.005 |

EXAMPLE 11

Following the procedure of Example 1, restorative cement compositions are prepared using as the binder glycerol trimethacrylate (GTMA) in one instance and trimethylolethane trimethacrylate (TMETMA) as the binder in the other. The remainder of the restorative cement is made up of filler which comprises on a total cement composition weight basis 82% finely divided crystalline quartz and .68% colloidal silica.

In each instance the physical properties of the cement is excellent as illustrated by the following Table:

TABLE FOR EXAMPLE 11

| Binder system | Compressive strength, p.s.i. | Tensile strength, p.s.i. | Flexural modulus, p.s.i. | Rockwell hardness, 30T Scale |
|---|---|---|---|---|
| GTMA | 42,938 | 7,545 | $2.26 \times 10^{-6}$ | 75 |
| TMETMA | 46,308 | 7,220 | $2.42 \times 10^{-6}$ | 75 |

Although the restorative cement compositions have a good appearance, their appearance is further enhanced by mixing with the monomer binder other monomer or monomers of the type previously indicated to bring the index of refraction of the binder resin within the desired range of 1.525 to 1.565. Thus the index of refraction of the quartz (1.545) is essentially matched by using as the binder resin either a monomer mix consisting of 31.0 parts by weight GTMA and 69.0 parts by weight BIS-GMA as based on the weight of binder or 28.5 parts by weight TMETMA and 71.5 parts by weight BIS-GMA.

In describing the present invention the trimethacrylate (TMPTMA) and triacrylate (TMPTA) monomer esters of 1,1,1-trimethylolpropane have been used to illustrate the preparation of restorative cement compositions as well as the similarity between the methacrylate and acrylate monomers and the manner of obtaining refractive indexes within the range of 1.525 to 1.565 through the inclusion of monomers of the particular group identified. This teaching is applicable to the trimethacrylate and triacrylate esters of all the aliphatic triols disclosed herein.

The advantages of dental restorative compositions in accordance with the invention are apparent from the foregoing. It will be seen that use of the monomers of the invention as a binder with inorganic filler materials in the manner disclosed results in compositions having significantly improved compressive strengths and appearance. Such dental restorative compositions are particularly desired for use in filling teeth such as in posterior restorations where high compressive strength is desired, the preferred compositions combining excellent appearance with high strength.

Having described the invention, what is claimed is:

1. A cement composition useful as a dental restorative comprising a major proportion of a particulate inorganic filler material of average particle size within the range of 15 to 30 microns,
    a binder for admixture with said filler material,
    a peroxide catalyst for polymerizing said binder,
    and an activator for producing free radicals upon reaction with said peroxide catalyst,
said binder comprising a monomer of the group consisting of monomer having the type formula

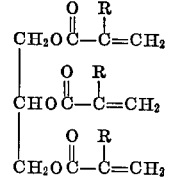

where R in each instance is H or $CH_3$ and monomer having the type formula

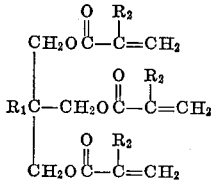

wherein $R_1$ is $CH_3$—, $CH_3CH_2$—, or $CH_3CH_2CH_2$— and $R_2$ is H or $CH_3$.

2. A composition in accordance with Claim 1, useful for filling teeth, wherein the inorganic filler material is employed in an amount of about 70 to 90% by weight.

3. A composition in accordance with Claim 1, useful for filling teeth, wherein the inorganic filler material is employed in an amount of about 75 to 85% by weight.

4. A composition in accordance with Claim 1 wherein the inorganic filler material is crystalline quartz having a particle size ranging from submicron to about 125 microns.

5. A composition in accordance with Claim 1 wherein the inorganic filler material is treated with a silane material which improves binding of the binder thereto.

6. A composition in accordance with Claim 5 wherein said silane material is gamma-methacryloxypropyltrimethoxysilane.

7. A composition in accordance with Claim 1 wherein said activator and said catalyst are separately formulated with other components for subsequent admixture.

8. A composition in accordance with Claim 1 wherein said peroxide catalyst is benzoyl peroxide.

9. A composition in accordance with Claim 1 wherin said activator is N,N-di(2-hydroxyethyl)-p-toluidine.

10. A cement composition of Claim 1 in which the index of refraction of the filler is substantially the same as the index of refraction of the polymerized binder.

11. A cement composition useful as a dental restorative comprising 70 to 90% by weight particulate quartz bonded together with 30 to 10 percent by weight of polymer having an index of refraction within the range of 1.525 to 1.565 prepared through the interpolymerization of a monomer mix comprising at least one monomer of a first group consisting of monomer having the type formula

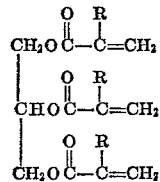

where R in each instance is H or $CH_3$ and monomer having the type formula

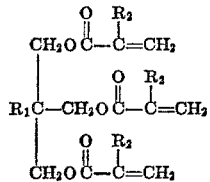

wherein $R_1$ is $CH_3-$, $CH_3CH_2-$, or $CH_3CH_2CH_2-$ and $R_2$ is H or $CH_3$ with at least one monomer of a second group consisting of 1,3-bis[2,3-di(methacryloxy)-propoxy]-benzene (RGTMA), 2,2-bis[4-(3-methacryloxy-2-hydroxypropoxy)-phenyl]-propane (BIS-GMA), 1,3-bis (3 - methacryloxy - 2 - hydroxypropoxy) - benzene (RGDMA), 2,2 - bis[4-(2-methacryloxyethoxy)-phenyl]-propane (SR–348), di(2-methacryloxyethyl) diphenyl silane, di(2-methacryloxy-methylethoxy) diphenyl silane, and methacrylate esters (CMDPO–25 Methacrylate) in which a methacryloxy group or groups are attached to diphenyl oxide nuclei through single methylene bridges, the monomers being represented by the general formula:

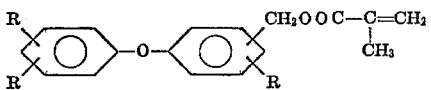

where R in each instance is at least one of the group consisting of

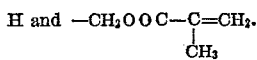

12. A cement composition of Claim 11 in which said binder consists essentially, as based on the weight of the binder, of 70 to 50 percent by weight of monomer having the formulae:

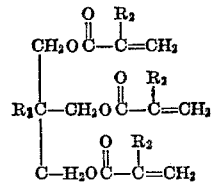

wherein
$R_1$ is $CH_3-$, $CH_3CH_2-$ or $CH_3CH_2CH_2-$
and $R_2$ is H or $CH_3$
and 30 to 50 percent by weight of at least one monomer of the group consisting of 1,3-bis[2,3-di(methacryloxy)-propoxy]-benzene (RGTMA), 2,2-bis[4-(3-methacryloxy-2-hydroxypropoxy)-phenyl]-propane (BIS-GMA), 1,3-bis(3-methacryloxy-2-hydroxypropoxy)-benzene (RGDMA), 2,2 - bis[4 - (2-methacryloxyethoxy)-phenyl] - propane (SR–348), di(2 - methacryloxyethyl) diphenyl silane, di(2-methacryloxy-methylethoxy) diphenyl silane, and methacrylate esters (CMDPO–25 Methacrylate) in which a methacryloxy group or groups are attached to diphenyl oxide nuclei through single methylene bridges, the monomers being represented by the general formula:

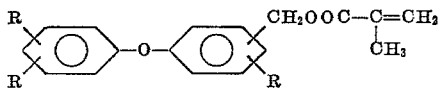

where R in each instance is at least one of the group consisting of

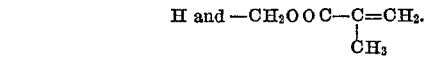

13. A cement composition of Claim 12 in which said monomer having the structural formula:

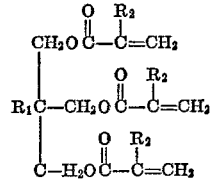

is trimethylolpropane trimethacrylate (TMPTMA).

14. A cement composition of Claim 13 in which the monomer of said second group is represented by the general formula:

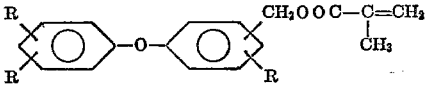

where R in each case is one of the group consisting of

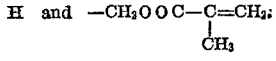

15. A cement composition of Claim 14 in which the monomer of said second group is a mixture of monomers having the distribution:

|  | Percent |
|---|---|
| o | 0–2 |
| p | 6–8 |
| o,p' | 20–23 |
| p,p' | 46–50 |
| o,p,p' | 13–23 |
| o,p,o'p' | 1–2 |

16. A cement composition of Claim 13 in which the monomer of said second group is 2,2-bis[4-(3-methacryloxy-2-hydroxypropoxy)-phenyl]-propane (BIS-GMA).

17. A cement composition of Claim 13 in which the monomer of said second group is 1,3-bis[2,3-di(methacryloxy)-propoxy]-benzene (RGTMA).

18. A cement composition of Claim 11 in which the monomer of said first group consists essentially of glycerol trimethacrylate (GTMA).

19. A cement composition of Claim 11 in which the monomer of said first group consists essentially of glycerol triacrylate (GTA).

20. A cement composition of Claim 11 in which the monomer of said first group consists essentially of trimethylolethane trimethacrylate (TMETMA).

21. A cement composition of Claim 11 in which the monomer of said first group consists essentially of trimethylolethane triacrylate (TMETA).

22. A cement composition of Claim 11 in which the monomer of said first group consists essentially of trimethylolpropane triacrylate (TMPTA).

23. In a direct dental filling system utilizing a binder and finely divided solid filler, an intimate mix of monomer binder and finely divided inorganic filler with the filler having an average particle size within the range of 15 to 30 microns and being present in an amount in excess of 50% by weight and said mix and at least 10% by weight of said monomer binder being a monomer of the group consisting of monomer having the general formula:

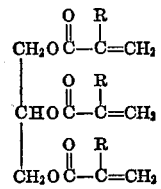

where R in each instance is H or $CH_3$ and monomer having the type formula

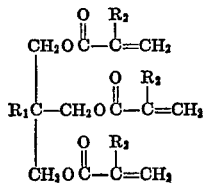

wherein $R_1$ is $CH_3-$, $CH_3CH_2-$, or $CH_3CH_2CH_2-$ and $R_2$ is H or $CH_3$.

24. A direct dental filling system of Claim 23, wherein at least 10% by weight of said monomer binder consists of a monomer having the type formula:

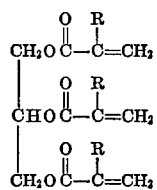

where R in each instance is H or $CH_3$.

25. A direct dental filling system of Claim 23, wherein at least 10% by weight of said monomer binder consists of a monomer having the type formula:

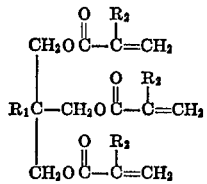

wherein $R_1$ is $CH_3-$, $CH_3CH_2-$, or $CH_3CH_2CH_2-$ and $R_2$ is H or $CH_3$.

References Cited
UNITED STATES PATENTS

| | | | |
|---|---|---|---|
| 3,539,533 | 11/1970 | Lee II et al. | 260—47 UA |
| 2,218,795 | 10/1940 | Kistler et al. | 260—86.1 E |
| 3,369,058 | 2/1968 | Keenan | 260—47 UA |
| 2,755,303 | 7/1956 | Schnell | 260—486 |
| 3,503,128 | 4/1970 | Boyd | 260—41 AX |
| 3,682,875 | 8/1972 | Sullivan | 260—89.5 R |
| 3,625,930 | 12/1971 | Toback | 260—89.5 |

LEWIS T. JACOBS, Primary Examiner

R. ZAITLEN, Assistant Examiner

U.S. Cl. X.R.

106—35; 260—89.5 R